(12) United States Patent
Gao et al.

(10) Patent No.: US 11,913,375 B2
(45) Date of Patent: Feb. 27, 2024

(54) BIAXIAL SUPPORTING DEVICE FOR ROTARY OPPOSED PISTON ENGINE

(71) Applicant: Beijing Institute of Technology, Beijing (CN)

(72) Inventors: Jianbing Gao, Beijing (CN); Yufeng Wang, Beijing (CN); Yuyang Wang, Beijing (CN); Zhicheng Lei, Beijing (CN); Tianhao Liu, Beijing (CN); Jingcan Liu, Beijing (CN); Xinjie Wang, Beijing (CN); Chaochen Ma, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/888,552

(22) Filed: Aug. 16, 2022

(65) Prior Publication Data
US 2022/0389861 A1    Dec. 8, 2022

(30) Foreign Application Priority Data
Mar. 18, 2022    (CN) .......................... 202210272865.8

(51) Int. Cl.
    *F02B 55/14*      (2006.01)
    *F01C 1/063*      (2006.01)
    *F02B 77/00*      (2006.01)

(52) U.S. Cl.
CPC .............. *F02B 55/14* (2013.01); *F01C 1/063* (2013.01); *F02B 77/00* (2013.01)

(58) Field of Classification Search
CPC ................................ F02B 55/14; F01C 1/063

USPC ......................................................... 123/245
See application file for complete search history.

(56) References Cited

U.S. PATENT DOCUMENTS

| | | | | |
|---|---|---|---|---|
| 3,396,632 | A * | 8/1968 | Leblanc | F01C 1/07 |
| | | | | 418/210 |
| 8,534,259 | B2 * | 9/2013 | Eckhardt | F01C 21/04 |
| | | | | 123/214 |
| 8,578,908 | B2 * | 11/2013 | Zhang | F02B 53/00 |
| | | | | 418/36 |
| 2015/0259959 | A1 | 9/2015 | Xu et al. | |
| 2016/0146684 | A1 | 5/2016 | Hsieh | |
| 2018/0313352 | A1 * | 11/2018 | Sandore | F01C 1/24 |
| 2019/0056768 | A1 | 2/2019 | Lin | |

FOREIGN PATENT DOCUMENTS

CN          1051070 A    *    5/1991

* cited by examiner

*Primary Examiner* — Ngoc T Nguyen
(74) *Attorney, Agent, or Firm* — Zhigang Ma (57) ABSTRACT

The present invention discloses a biaxial supporting device for a rotary opposed piston engine, comprising a cylinder body, a fixing component, a thick axle and a thin axle; the interior of the cylinder body has a cavity; the fixing component is fixed on the outer side wall of the cylinder body; the thick axle is provided with a through hole coaxial with the first axle hole, and is rotatably connected with the through hole; the thin axle is in transition fit with the through hole of the thick axle, and is rotatably connected with the fixing component. The present invention has simple structure, can effectively reduce a diameter difference of two axles to ensure the relatively small diameter of the thick axle and the relatively high strength of the thin axle, and can effectively realize biaxial support of the rotary opposed piston engine.

11 Claims, 7 Drawing Sheets

BIAXIAL SUPPORTING DEVICE FOR ROTARY OPPOSED PISTON ENGINE

TECHNICAL FIELD

The present invention relates to the technical field of internal combustion engines, in particular to a biaxial supporting device for a rotary opposed piston engine.

BACKGROUND

The traditional four-stroke internal combustion engine works slowly, and has complex crank-link mechanisms and valve mechanisms, resulting in low power per liter, large volume, complex structure, more moving parts and high maintenance cost of the traditional four-stroke internal combustion engine. The scavenging loss and post-exhaust loss of the traditional two-stroke engine are serious, causing that a large amount of unburned hydrocarbon is emitted with tail gas. The two-stroke engine has short air change time and small valve area, leading to low charge efficiency of the two-stroke internal combustion engine. The compression ratio of the two-stroke internal combustion engine is less than that of the traditional four-stroke engine, resulting in low thermal efficiency. A rotor engine has an elongated combustion chamber with a relatively large surface volume and serious heat loss, resulting in high emission of unburned hydrocarbon and low thermal efficiency of the rotor engine. Because the seal structure of the rotor engine is complicated and difficult, a sealing problem becomes one of key factors that restrict the development of the rotor engine.

As a novel internal combustion engine, a rotary opposed piston engine can be used in main power systems and auxiliary power systems such as special vehicles, small unmanned aerial vehicles, hybrid vehicles and agricultural machinery, has the advantages of high working frequency of the two-stroke engine and high thermal efficiency of the four-stroke engine, and has simple structure, small volume, light weight and high power density. The rotary opposed piston engine has no complex crank-link mechanisms and valve mechanisms, and the opening of inlet and exhaust valves is controlled by the rotation of a piston. Because the inlet valve, the exhaust valve and a fuel injection system are arranged separately, the area of the inlet and exhaust valves is relatively large, which is beneficial to improve the charge efficiency of the engine. When a power output shaft of the rotary opposed piston engine rotates by one cycle, each cylinder finishes a complete working process; the working frequency of the engine is twice that of the traditional four-stroke reciprocating piston engine, and the intake and exhaust processes and the combustion process are better than those of the two-stroke engine. The rotary opposed piston engine uses two axles connected to two pistons respectively, and one axle penetrates through the other axle. A special way is needed to support the two axles in a cylinder body of the rotary opposed piston engine. However, the traditional method for biaxial support is complicated in structure, which seriously weakens the advantage of simple structure of the rotary opposed piston engine. In the traditional support method, a bearing of a thin axle is nested in an axle hole of a thick axle to support the thin axle, resulting in a large diameter difference between the two axles, which is difficult to solve a contradiction between reduction of the volume of the axle and improvement of the strength of the axle.

Therefore, the problem to be urgently solved by those skilled in the art is how to provide a biaxial supporting device for an engine which has simple structure, can effectively reduce the diameter difference of two axles to ensure the relatively small diameter of the thick axle and the relatively high strength of the thin axle, can effectively realize biaxial support of the rotary opposed piston engine and can output the power of the engine to a power consumption mechanism.

SUMMARY

In view of this, the present invention provides a biaxial supporting device for a rotary opposed piston engine to solve the above technical problems.

To achieve the above purpose, the present invention adopts the following technical solution:

A biaxial supporting device for a rotary opposed piston engine comprises:
  a cylinder body, wherein the interior of the cylinder body has a cavity, and two opposite wall sides are provided with a first axle hole and a second axle hole;
  a fixing component, wherein the fixing component is fixed on the outer side wall of the cylinder body and corresponds to the first axle hole;
  a thick axle, wherein the thick axle penetrates through the first axle hole and is rotatably connected with the first axle hole, and the thick axle is provided with a coaxial through hole;
  a thin axle, wherein the thin axle is in transition fit with the through hole; one end of the thin axle penetrates through the through hole and is rotatably connected with the fixing component, and the other end has a shoulder; and the shoulder is abutted against the end surface of the thick axle located inside the cavity.

Through the above technical solution, the biaxial supporting device for the rotary opposed piston engine provided by the present invention comprises the cylinder body, the fixing component, the thick axle and the thin axle; the interior of the cylinder body has a cavity; the fixing component is fixed on the outer side wall of the cylinder body; the thick axle is provided with a through hole coaxial with the first axle hole, and is rotatably connected with the through hole; the thin axle is in transition fit with the through hole of the thick axle, and is rotatably connected with the fixing component. The present invention has simple structure, can effectively reduce a diameter difference of two axles to ensure the relatively small diameter of the thick axle and the relatively high strength of the thin axle, and can effectively realize biaxial support of the rotary opposed piston engine.

Preferably, in the above biaxial supporting device for the rotary opposed piston engine, the cylinder body is cylindrical.

Preferably, in the above biaxial supporting device for the rotary opposed piston engine, the fixing component comprises a first fixing element, a second fixing element and a third fixing element;

A first bearing is installed in the first fixing element, and first bolt holes are formed at both ends of the first fixing element; the side wall of the cylinder body is provided with fourth bolt holes corresponding to the first bolt holes; the first fixing element is fixed on one side, having the first axle hole, of the cylinder body through bolts;

A second bearing is installed in the second fixing element, and second bolt holes are formed at both ends of the second fixing element; the side wall of the cylinder body is provided with fifth bolt holes corresponding to the second bolt holes; the second fixing element is fixed on one side, having the first axle hole, of the cylinder body through bolts, and sleeved on the outer side of the first fixing element;

A third bearing is installed in the third fixing element, and third bolt holes are formed at both ends of the third fixing element; the side wall of the cylinder body is provided with sixth bolt holes corresponding to the third bolt holes; and the third fixing element is fixedly installed on one side, having the second axle hole, of the cylinder body through bolts. The structure is simple and stable. The bearing is supported on a corresponding fixing element, and the fixing element is fixed on the cylinder body of the engine through the bolt holes, so as to realize biaxial support of the rotary opposed piston engine and output the power of the engine to a power consumption device.

Preferably, in the above biaxial supporting device for the rotary opposed piston engine, the first bearing is sleeved on the outer side of the thick axle, to realize the support for the thick axle, with simple and stable structure.

Preferably, in the above biaxial supporting device for the rotary opposed piston engine, the second bearing is sleeved on the outer side of the thin axle extending to one end of the outer side of the thick axle, to realize the support for the thin axle, with simple and stable structure.

Preferably, in the above biaxial supporting device for the rotary opposed piston engine, the third bearing is sleeved on the outer side of the shoulder, to realize the effective support for the shoulder of the thin axle, with simple and stable structure.

Preferably, in the above biaxial supporting device for the rotary opposed piston engine, the first axle hole and the second axle hole are located in the center of two side walls of the cylinder body, and the first axle hole and the second axle hole have the same diameter. Thus, the entire device is more stable.

Preferably, in the above biaxial supporting device for the rotary opposed piston engine, the shoulder and the thick axle have the same diameter. Stable fit between the thick axle and the thin axle can be ensured.

Preferably, in the above biaxial supporting device for the rotary opposed piston engine, the first fixing element and the third fixing element have the same size. The structure is simple and stable.

It can be known from the above technical solution that compared with the prior art, the present invention provides a biaxial supporting device for a rotary opposed piston engine, and has the following beneficial effects:
1. The structure is simple and stable.
2. The present invention can ensure the relatively small diameter of the thick axle and the relatively high strength of the thin axle, and can effectively realize biaxial support of the rotary opposed piston engine, so as to output the power of the engine to a power consumption mechanism.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the Drawings:
1—cylinder body;
11—cavity; 12—first axle hole; 13—second axle hole; 14—fourth bolt hole; 15—fifth bolt hole; 16—sixth bolt hole;
2—fixing component;
21—first fixing element; 211—first bearing; 212—first bolt hole; 22—second fixing element; 221—second bearing; 222—second bolt hole; 23—third fixing element; 231—third bearing; 232—third bolt hole;
3—thick axle;
31—through hole;
4—thin axle;
41—shoulder.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

With reference to FIG. 1 to FIG. 7, embodiments of the present invention disclose a biaxial supporting device for a rotary opposed piston engine, comprising:
  a cylinder body 1, wherein the interior of the cylinder body 1 has a cavity 11, and two opposite wall sides are provided with a first axle hole 12 and a second axle hole 13;
  a fixing component 2, wherein the fixing component 2 is fixed on the outer side wall of the cylinder body 1 and corresponds to the first axle hole 12;
  a thick axle 3, wherein the thick axle 3 penetrates through the first axle hole 12 and is rotatably connected with the first axle hole 12, and the thick axle 3 is provided with a coaxial through hole 31;
  a thin axle 4, wherein the thin axle 4 is in transition fit with the through hole 31; one end of the thin axle 4 penetrates through the through hole 31 and is rotatably connected with the fixing component 2, and the other end has a shoulder 41; and the shoulder 41 is abutted against the end surface of the thick axle 3 located inside the cavity 11.

Figure 1:
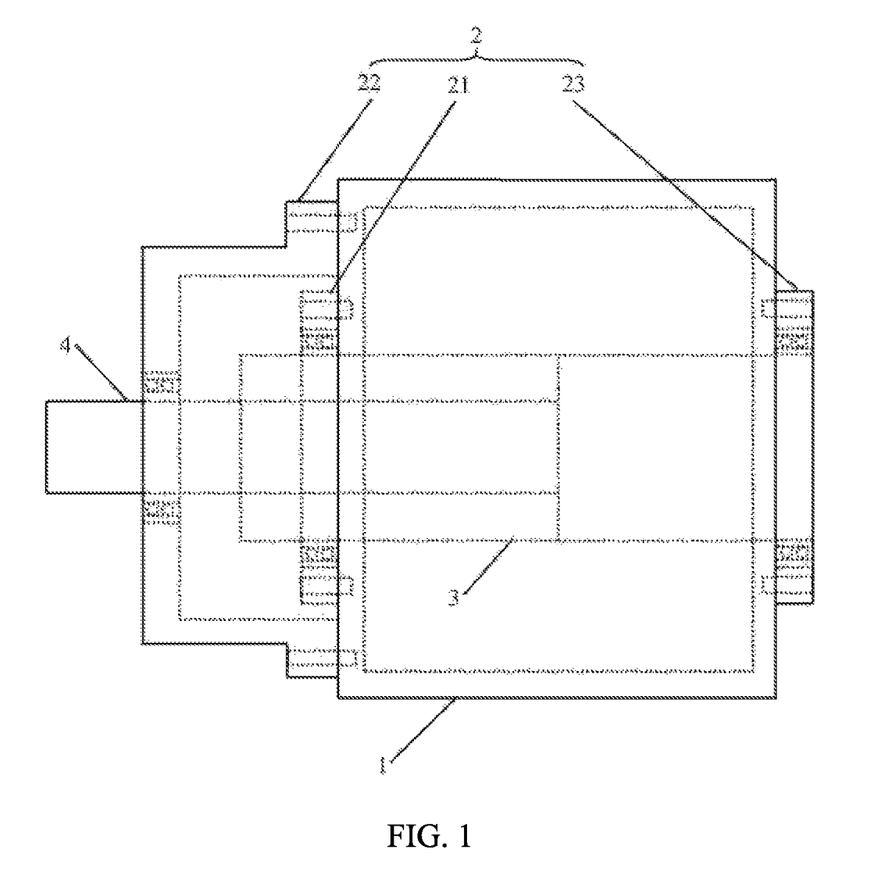
FIG. 1 is a structural schematic diagram of a biaxial supporting device for a rotary opposed piston engine provided by the present invention.
Figure 2:
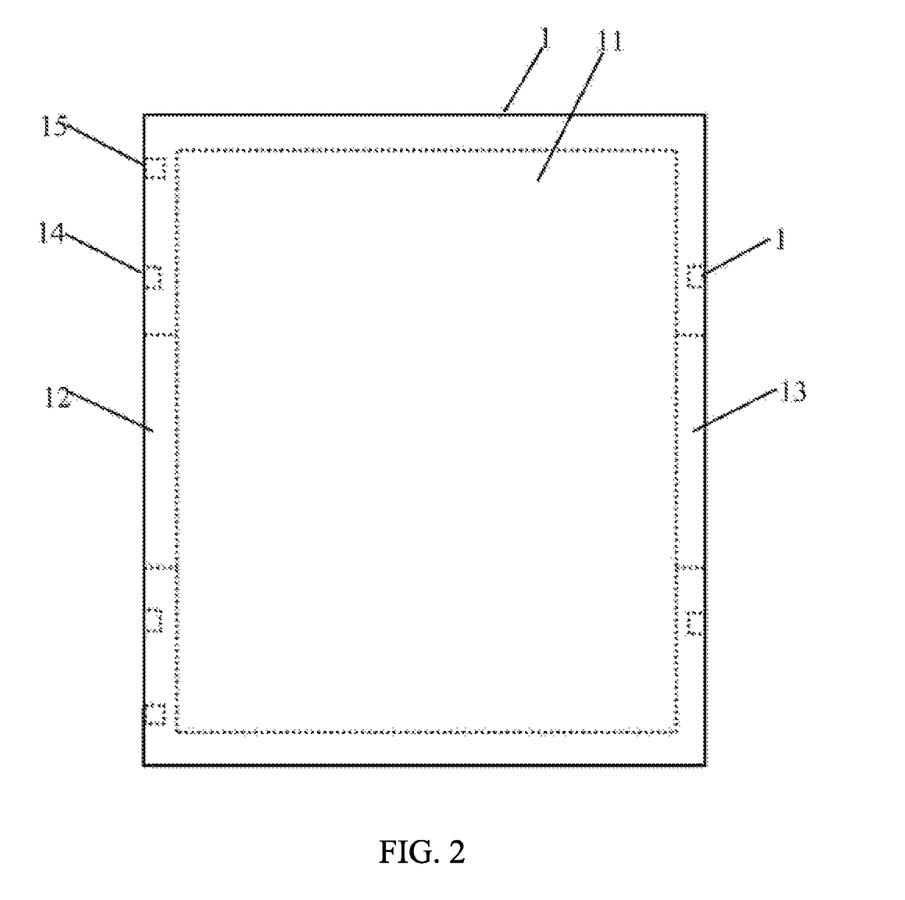
FIG. 2 is a structural schematic diagram of a cylinder body provided by the present invention.

To further optimize the above technical solution, the cylinder body 1 is cylindrical.

Figure 5:
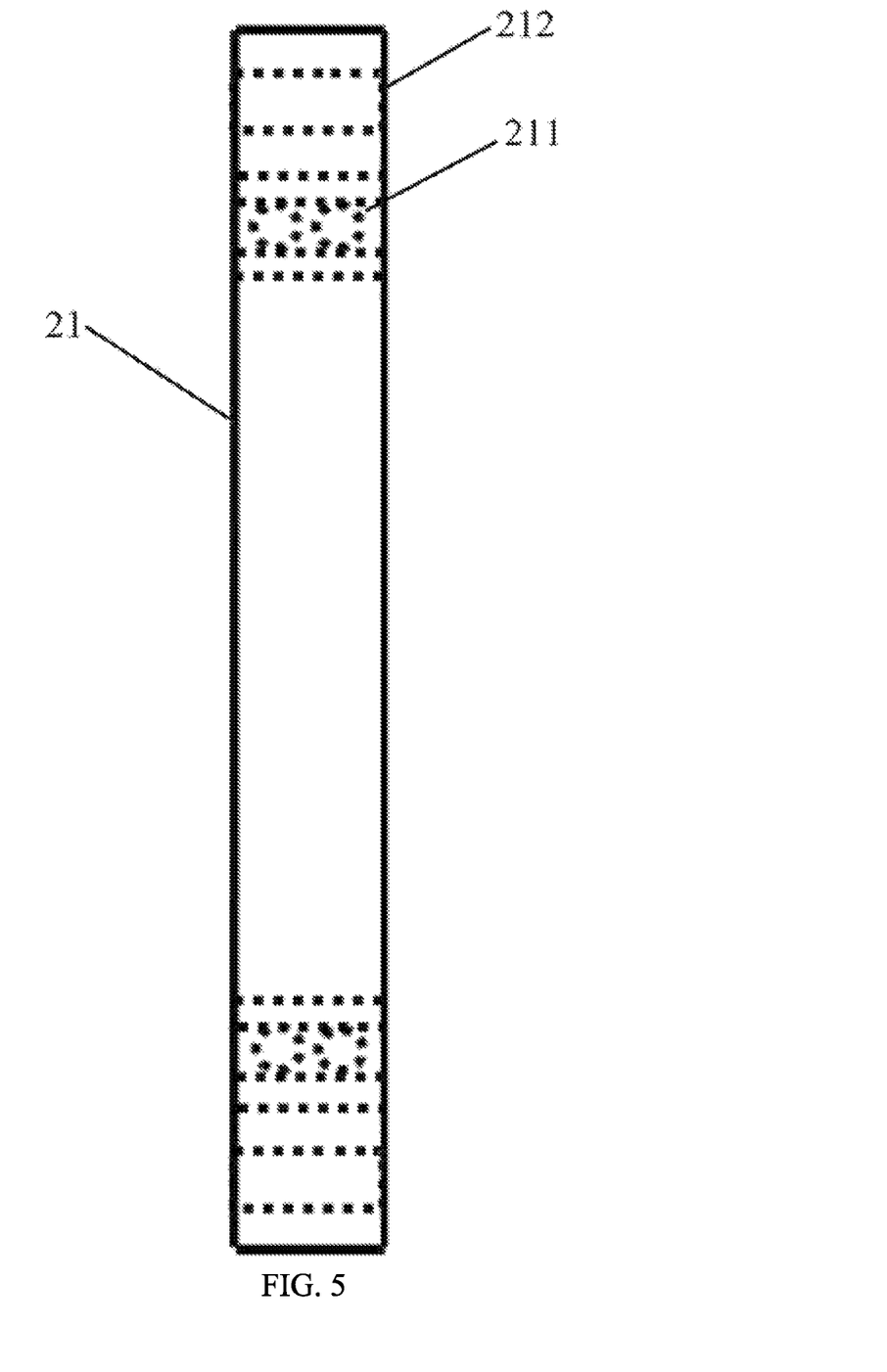
FIG. 5 is a structural schematic diagram of a first fixing element provided by the present invention.
Figure 6:
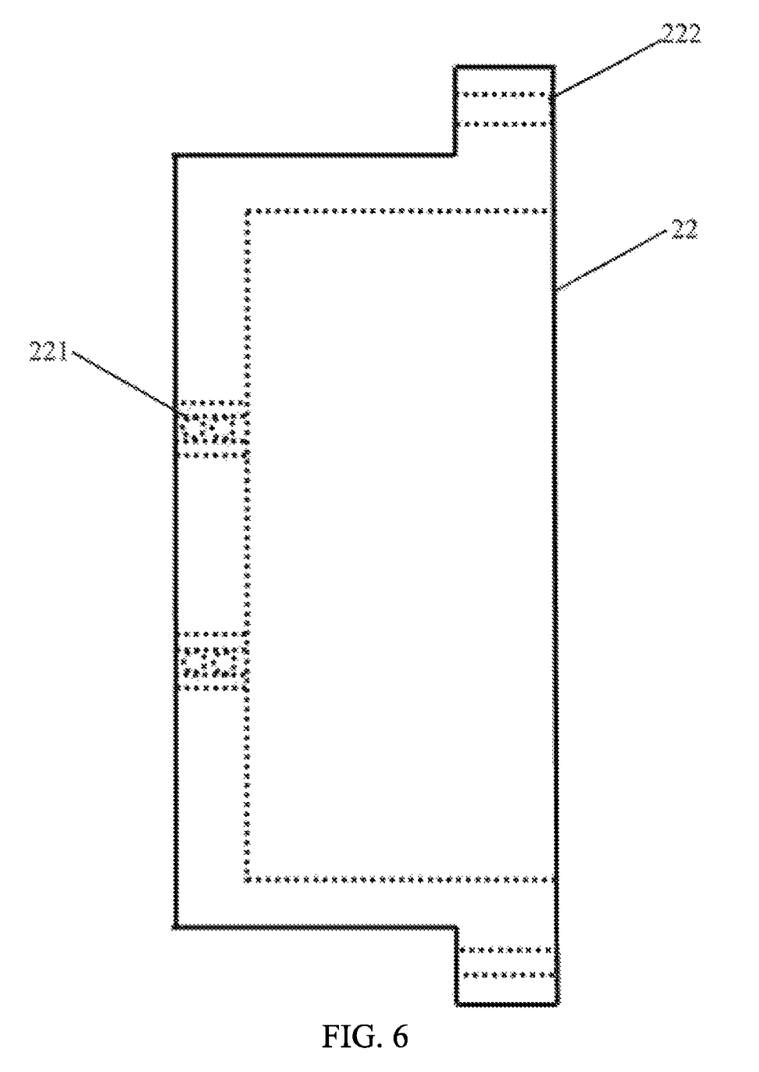
FIG. 6 is a structural schematic diagram of a second fixing element provided by the present invention.
Figure 7:
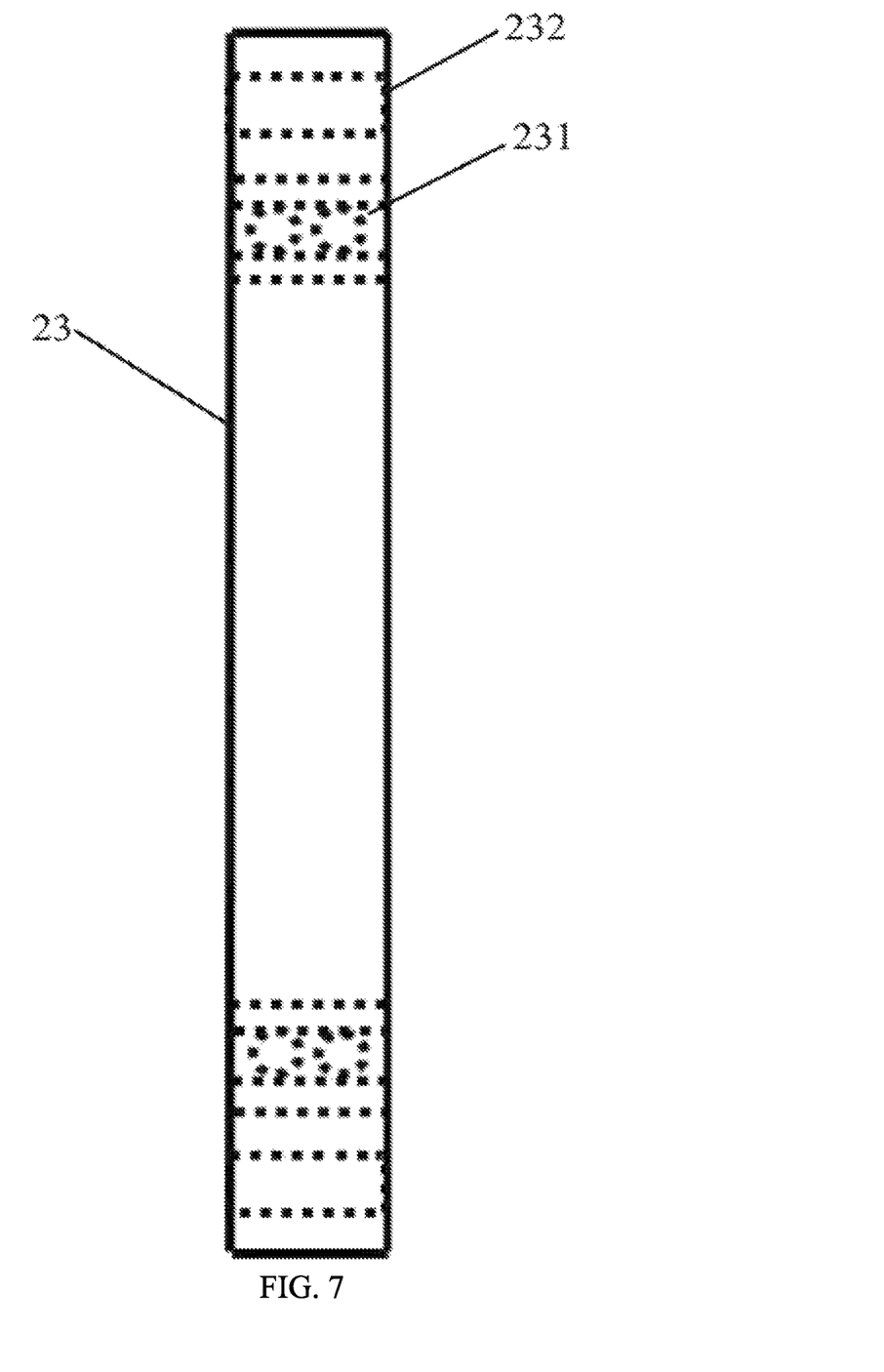
FIG. 7 is a structural schematic diagram of a third fixing element provided by the present invention.

To further optimize the above technical solution, the fixing component 2 comprises a first fixing element 21, a second fixing element 22 and a third fixing element 23;

A first bearing 211 is installed in the first fixing element 21, and first bolt holes 212 are formed at both ends of the first fixing element 21; the side wall of the cylinder body 1 is provided with fourth bolt holes 14 corresponding to the first bolt holes 212; and the first fixing element 21 is fixed on one side, having the first axle hole 12, of the cylinder body 1 through bolts.

A second bearing 221 is installed in the second fixing element 22, and second bolt holes 222 are formed at both ends of the second fixing element 22; the side wall of the cylinder body 1 is provided with fifth bolt holes 15 corresponding to the second bolt holes 222; and the second fixing element 22 is fixed on one side, having the first axle hole 12, of the cylinder body 1 through bolts, and sleeved on the outer side of the first fixing element 21.

A third bearing 231 is installed in the third fixing element 23, and third bolt holes 232 are formed at both ends of the third fixing element 23; the side wall of the cylinder body 1 is provided with sixth bolt holes 16 corresponding to the third bolt holes 232; and the third fixing element 23 is fixedly installed on one side, having the second axle hole 13, of the cylinder body 1 through bolts.

To further optimize the above technical solution, the first bearing 211 is sleeved on the outer side of the thick axle 3.

To further optimize the above technical solution, the second bearing 221 is sleeved on the outer side of the thin axle 4 extending to one end of the outer side of the thick axle 3.

To further optimize the above technical solution, the third bearing 231 is sleeved on the outer side of the shoulder 41.

To further optimize the above technical solution, the first axle hole 12 and the second axle hole 13 are located in the center of two side walls of the cylinder body 1, and the first axle hole 12 and the second axle hole 13 have the same diameter.

Figure 3:
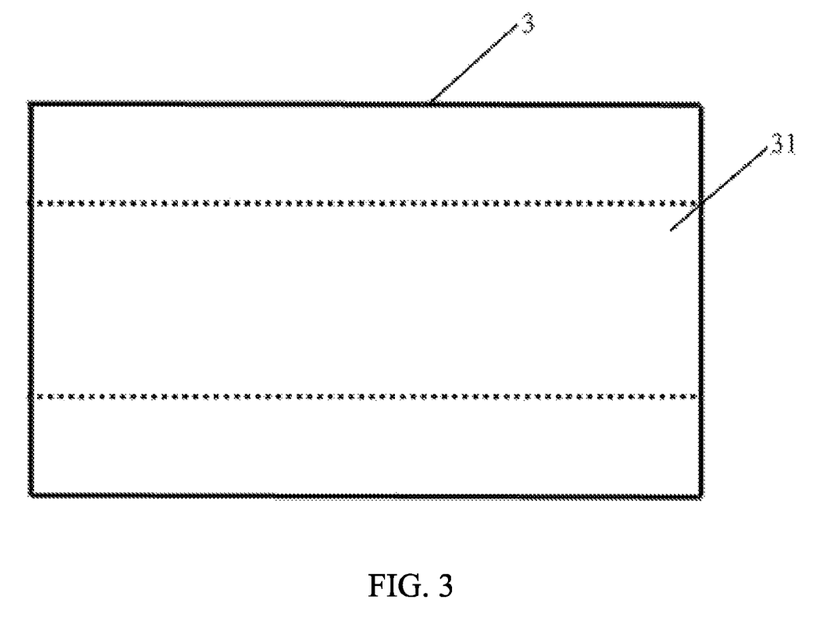
FIG. 3 is a structural schematic diagram of a thick axle provided by the present invention.
Figure 4:
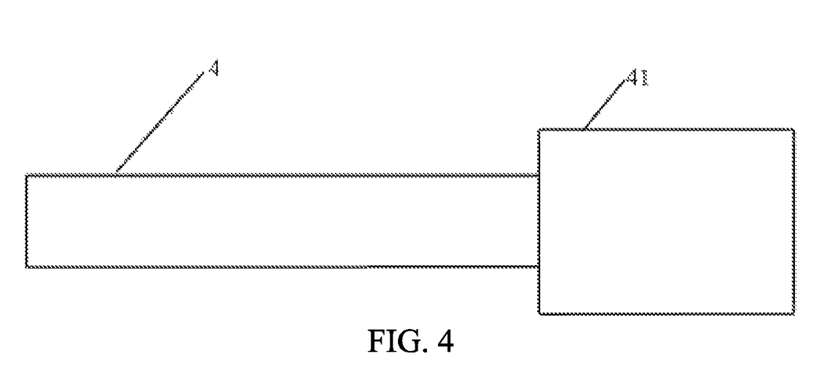
FIG. 4 is a structural schematic diagram of a thin axle provided by the present invention.

To further optimize the above technical solution, the shoulder 41 and the thick axle 3 have the same diameter.

To further optimize the above technical solution, the first fixing element 21 and the third fixing element 23 have the same size.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A biaxial supporting device for a rotary opposed piston engine, comprising:
   a cylinder body (1), wherein the interior of the cylinder body (1) has a cavity (11), and two opposite wall sides are provided with a first axle hole (12) and a second axle hole (13);
   a fixing component (2), wherein the fixing component (2) is fixed on the outer side wall of the cylinder body (1) and corresponds to the first axle hole (12);
   a thick axle (3), wherein the thick axle (3) penetrates through the first axle hole (12) and is rotatably connected with the first axle hole (12), and the thick axle (3) is provided with a coaxial through hole (31);
   a thin axle (4), wherein the thin axle (4) is in transition fit with the through hole (31);
   one end of the thin axle (4) penetrates through the through hole (31) and is rotatably connected with the fixing component (2), and the other end has a shoulder (41); and
   one end of the shoulder (41) is abutted against the end surface of the thick axle (3) located inside the cavity (11), and another end of the shoulder (41) extends out of the cavity (11) through the second axle hole (13).

2. The biaxial supporting device for the rotary opposed piston engine according to claim 1, wherein the cylinder body (1) is cylindrical.

3. The biaxial supporting device for the rotary opposed piston engine according to claim 1, wherein the fixing component (2) comprises a first fixing element (21), a second fixing element (22) and a third fixing element (23);
   a first bearing (211) is installed in the first fixing element (21), and first bolt holes (212) are formed at both ends of the first fixing element (21); the side wall of the cylinder body (1) is provided with fourth bolt holes (14) corresponding to the first bolt holes (212); the first fixing element (21) is fixed on one side, having the first axle hole (12), of the cylinder body (1) through bolts;
   a second bearing (221) is installed in the second fixing element (22), and second bolt holes (222) are formed at both ends of the second fixing element (22); the side wall of the cylinder body (1) is provided with fifth bolt holes (15) corresponding to the second bolt holes (222); the second fixing element (22) is fixed on one side, having the first axle hole (12), of the cylinder body (1) through bolts, and sleeved on the outer side of the first fixing element (21);
   a third bearing (231) is installed in the third fixing element (23), and third bolt holes (232) are formed at both ends of the third fixing element (23); the side wall of the cylinder body (1) is provided with sixth bolt holes (16) corresponding to the third bolt holes (232); and the third fixing element (23) is fixedly installed on one side, having the second axle hole (13), of the cylinder body (1) through bolts.

4. The biaxial supporting device for the rotary opposed piston engine according to claim 3, wherein the first bearing (211) is sleeved on the outer side of the thick axle (3).

5. The biaxial supporting device for the rotary opposed piston engine according to claim 3, wherein the second bearing (221) is sleeved on the outer side of the thin axle (4) extending to one end of the outer side of the thick axle (3).

6. The biaxial supporting device for the rotary opposed piston engine according to claim 3, wherein the third bearing (231) is sleeved on the outer side of the shoulder (41).

7. The biaxial supporting device for the rotary opposed piston engine according to claim 3, wherein the first fixing element (21) and the third fixing element (23) have the same size.

8. The biaxial supporting device for the rotary opposed piston engine according to claim 1, wherein the first axle hole (12) and the second axle hole (13) are located in the center of two side walls of the cylinder body (1), and the first axle hole (12) and the second axle hole (13) have the same diameter.

9. The biaxial supporting device for the rotary opposed piston engine according to claim 1, wherein the shoulder (41) and the thick axle (3) have the same diameter.

10. The biaxial supporting device for the rotary opposed piston engine according to claim 1, wherein the fixing component (2) comprises a first fixing element (21), a second fixing element (22) and a third fixing element (23); the first fixing element (21) is fixed on one side, having the first axle hole (12), of the cylinder body (1), and configured to be rotatably connected with one end of the thick axle (3); the second fixing element (22) is sleeved on an outer side of the first fixing element (21) and configured to be rotatably connected with the one end of the thin axle (4); the third fixing element (23) is fixedly installed on one side, having the second axle hole (13), of the cylinder body (1), and configured to be rotatably connected with said another end of the shoulder (41).

11. The biaxial supporting device for the rotary opposed piston engine according to claim 10, wherein the first fixing element (21) together with the second fixing element (22) defines a second cavity, and an end of the thick axle (3) away from the shoulder (41) is located in the second cavity.

\* \* \* \* \*